(12) United States Patent
Kwon

(10) Patent No.: US 12,447,529 B2
(45) Date of Patent: Oct. 21, 2025

(54) METHOD FOR MANUFACTURING HETEROGENEOUS COMPOSITE MATERIAL THIN PLATE AND HETEROGENEOUS COMPOSITE MATERIAL THIN PLATE MANUFACTURED BY SAME

(71) Applicant: Pukyong National University Industry-University Cooperation Foundation, Busan (KR)

(72) Inventor: Hansang Kwon, Busan (KR)

(73) Assignee: Pukyong National University Industry-University Cooperation Foundation, Busan (KR)

( * ) Notice: Subject to any disclaimer, the term of this patent is extended or adjusted under 35 U.S.C. 154(b) by 380 days.

(21) Appl. No.: 18/247,951

(22) PCT Filed: Oct. 15, 2021

(86) PCT No.: PCT/KR2021/014363
§ 371 (c)(1),
(2) Date: Apr. 5, 2023

(87) PCT Pub. No.: WO2022/080950
PCT Pub. Date: Apr. 21, 2022

(65) Prior Publication Data
US 2023/0373002 A1    Nov. 23, 2023

(30) Foreign Application Priority Data
Oct. 15, 2020  (KR) .................. 10-2020-0133530

(51) Int. Cl.
*B22F 7/02* (2006.01)
*B22F 3/105* (2006.01)
(Continued)

(52) U.S. Cl.
CPC ............. *B22F 7/02* (2013.01); *B22F 3/105* (2013.01); *B22F 3/18* (2013.01); *B22F 5/006* (2013.01);
(Continued)

(58) Field of Classification Search
CPC .... B22F 7/02; B22F 3/105; B22F 3/18; B22F 5/006; B22F 9/04; B22F 2009/043;
(Continued)

(56) References Cited

U.S. PATENT DOCUMENTS

2011/0068299 A1\* 3/2011 Hong ................ C22C 1/1084
252/182.33

FOREIGN PATENT DOCUMENTS

| KR | 10-2014-0125033 A | 10/2014 |
| KR | 10-2016-0072943 A | 6/2016 |

(Continued)

OTHER PUBLICATIONS

International Search Report for International Application No. PCT/KR2021/014363 dated Jan. 5, 2022.

*Primary Examiner* — Ricardo D Morales
(74) *Attorney, Agent, or Firm* — Harness, Dickey & Pierce, P.L.C.

(57) ABSTRACT

The present invention relates to a method for manufacturing a heterogeneous composite material thin plate and a heterogeneous composite material thin plate manufactured by same, the method comprising the steps of: (a) ball-milling an aluminum or aluminum alloy powder and a carbon nanotube powder so as to prepare a composite powder; (b) preparing a multi-layered billet comprising the composite powder, the multi-layered billet characterized by comprising a core layer and two or more shell layers surrounding the core layer, wherein the core layer is made of the composite powder or an aluminum alloy, the shell layers excluding the outermost (Continued)

shell layer are made of the composite powder, and the outermost shell layer is made of (i) an aluminum or aluminum alloy powder or (ii) the composite powder; and (c) rolling the multi-layered billet so as to form a thin plate shape.

6 Claims, 4 Drawing Sheets

(51) Int. Cl.
*B22F 3/18* (2006.01)
*B22F 5/00* (2006.01)
*B22F 9/04* (2006.01)

(52) U.S. Cl.
CPC .......... *B22F 9/04* (2013.01); *B22F 2009/043* (2013.01); *B22F 2202/13* (2013.01); *B22F 2301/052* (2013.01); *B22F 2302/403* (2013.01); *B22F 2304/10* (2013.01); *B22F 2998/10* (2013.01)

(58) Field of Classification Search
CPC ............ B22F 2202/13; B22F 2301/052; B22F 2302/403; B22F 2304/10; B22F 2998/10; C22C 1/059; C22C 21/00; C22C 1/0416; Y02P 10/25
See application file for complete search history.

(56) References Cited

FOREIGN PATENT DOCUMENTS

| KR | 101755988 B1 | 7/2017 | |
|---|---|---|---|
| KR | 101822073 B1 * | 1/2018 | ............ B21C 23/22 |
| KR | 101844884 B1 | 4/2018 | |
| KR | 10-2020-0112503 A | 10/2020 | |

* cited by examiner

METHOD FOR MANUFACTURING HETEROGENEOUS COMPOSITE MATERIAL THIN PLATE AND HETEROGENEOUS COMPOSITE MATERIAL THIN PLATE MANUFACTURED BY SAME

CROSS-REFERENCE TO RELATED APPLICATIONS

This application is a national phase under 35 U.S.C. § 371 of PCT International Application No. PCT/KR2021/014363 which has an International filing date of Oct. 15, 2021, which claims priority to Korean Application No. 10-2020-0133530, filed Oct. 15, 2020, the entire contents of each of which are hereby incorporated by reference.

TECHNICAL FIELD

The present disclosure relates to a method of manufacturing a plastically-worked material made of a heterogeneous composite material, in which different materials are combined, and a plastically-worked material manufactured thereby.

BACKGROUND ART

Aluminum and aluminum alloys have slightly lower thermal conductivity than copper, which is widely known to have excellent thermal conductivity, but are relatively inexpensive and have excellent mechanical properties, such as specific strength, malleability, and ductility. As a result, aluminum and aluminum alloys have the advantage of being processible in virtually any form, such as rods, tubes, boards, foils, timbers, and the like, and are thus used as multipurpose heat dissipation materials in various forms.

To further extend the application range of such aluminum or aluminum alloys, heterogeneous materials are required to be combined with aluminum or aluminum alloy to further enhance physical properties, such as mechanical properties and thermal conductivity.

For example, a carbon nanotube-reinforced aluminum matrix heterogeneous composite material manufactured by combining aluminum or aluminum alloy matrix, using carbon nanotubes (CNT) as a reinforcing material, can be custom-designed depending on characteristics, such as ultra-light weight, high strength, high heat dissipation, and the like.

In particular, materials shaped into a thin plate having excellent mechanical properties and thermal conductivity are expected to be applicable as functional materials in various industries.

DISCLOSURE

Technical Problem

To solve the problems, an objective of the present disclosure is to provide a method of manufacturing a heterogeneous composite material thin plate made of heterogeneous composite material, in which aluminum (or an aluminum alloy) and carbon nanotubes (CNTs) are combined, the thin plate with excellent physical properties, thermal conductivity, and the like. Another objective of the present disclosure is to provide a heterogeneous composite material thin plate manufactured thereby.

Technical Solution

In order to accomplish the above objective, the present disclosure proposes a method of manufacturing a heterogeneous composite material thin plate including: (a) preparing a composite powder by ball-milling an aluminum or aluminum alloy powder and a carbon nanotube powder; (b) manufacturing a multilayer billet containing the composite powder and including a core layer and two or more shell layers surrounding the core layer, in which the core layer is made of the composite powder or an aluminum alloy, each of the shell layers excluding the outermost shell layer is made of the composite powder, and the outermost shell layer is made of (i) aluminum or aluminum alloy powder or (ii) the composite powder; and (c) shaping the multilayer billet into a thin plate by rolling.

In addition, proposed is the method characterized in that the core layer is made of the composite powder, and the respective composite powders contained in the core layer and each of the shell layers excluding the outermost shell layer differ in composition.

In addition, proposed is the method characterized in that the multilayer billet includes: the core layer; a first shell layer surrounding the core layer; and a second shell layer surrounding the first shell layer.

In addition, proposed is the method characterized in that the multilayer billet comprises: a can-shaped first billet serving as the second shell layer; a second billet placed in the first billet and serving as the first shell layer; and a third billet placed in the second billet and serving as the core layer.

In addition, proposed is the method characterized in that in the (b) manufacturing, the multilayer billet is subjected to spark plasma sintering under conditions: a temperature in a range of 280° C. to 600° C., a pressure in a range of 30 MPa to 100 MPa, and a duration in a range of 1 second to 30 minutes.

Furthermore, in another aspect of the present disclosure, proposed is a heterogeneous composite material thin plate manufactured by the method described above.

Advantageous Effects

According to the present disclosure, aluminum (or aluminum alloy) and carbon nanotubes are allowed to be combined to maximize the advantages of each material as well as to compensate for the disadvantages thereof. In addition, an aluminum (or aluminum alloy)-carbon nanotube heterogeneous composite material thin plate can be manufactured in high yield through a simple and rapid process while being able to be applied to a variety of fields (including battery cases, 5G repeaters, ESS cases, packaging materials for medicines and the like, container materials, heat exchanger fins, wire covering materials, etc.) depending on a thickness thereof due to its thin plate form.

BEST MODE

In the following description of the present disclosure, detailed descriptions of known functions and components incorporated herein will be omitted when it may make the subject matter of the present disclosure unclear.

Reference will now be made in detail to various embodiments of the present disclosure, specific examples of which are illustrated in the accompanying drawings and described below, since the embodiments of the present disclosure can be variously modified in many different forms. While the present disclosure will be described in conjunction with exemplary embodiments thereof, it is to be understood that the present description is not intended to limit the present disclosure to those exemplary embodiments. On the contrary, the present disclosure is intended to cover not only the exemplary embodiments, but also various alternatives, modifications, equivalents and other embodiments that may be included within the spirit and scope of the present disclosure as defined by the appended claims.

The terminology used herein is for the purpose of describing particular embodiments only and is not intended to be limiting. As used herein, the singular forms are intended to include the plural forms as well, unless the context clearly indicates otherwise. It will be further understood that the terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

Hereinafter, the present disclosure will be described in detail.

Figure 1:
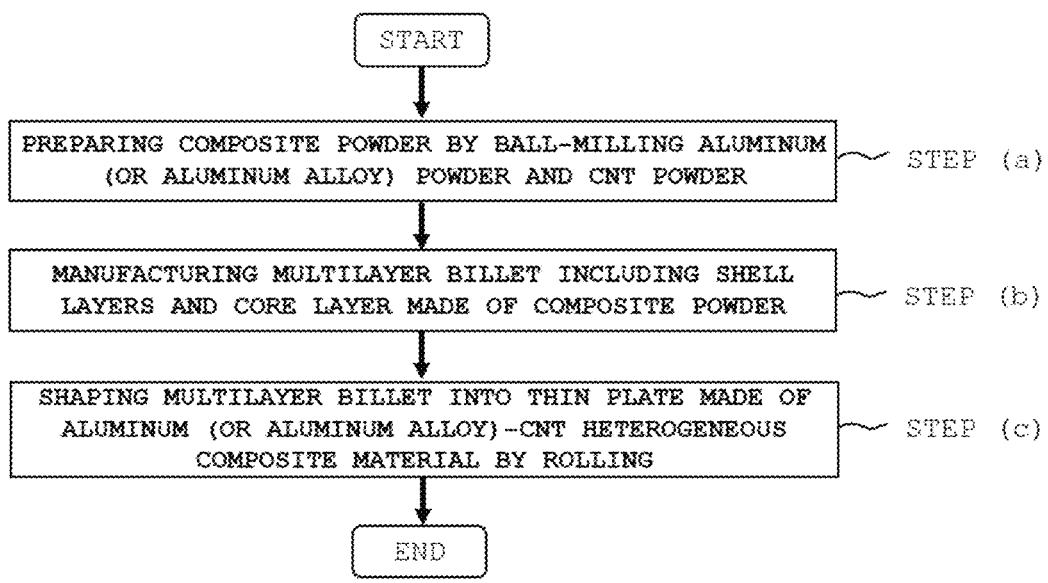
FIG. 1 is a process flowchart illustrating a method of manufacturing a heterogeneous composite material thin plate according to the present disclosure.

A method of manufacturing a heterogeneous composite material thin plate, according to the present disclosure, includes: (a) preparing a composite powder by ball-milling an aluminum or aluminum alloy powder and a carbon nanotube powder; (b) manufacturing a multilayer billet comprising the composite powder and including a core layer and two or more shell layers surrounding the core layer, in which the core layer is made of the composite powder or an aluminum alloy, each of the shell layers excluding the outermost shell layer is made of the composite powder, and the outermost shell layer is made of (i) aluminum or aluminum alloy powder or (ii) the composite powder; and (c) shaping the multilayer billet into a thin plate by rolling (FIG. 1).

In the (a) preparing, the aluminum alloy powder may include any one selected from the group consisting of 1000 series, 2000 series, 3000 series, 4000 series, 5000 series, 6000 series, 7000 series, and 8000 series.

As the composite powder contains the carbon nanotubes, when the billet, manufactured using the prepared composite powder, undergoes plastic working, such as rolling, extruding, forging, and the like, to manufacture a composite material, such as a clad material and the like, the corresponding composite material may have high thermal conductivity, high strength, and lightweight characteristics.

On the other hand, micro-sized aluminum alloy particles have a large difference in particle diameter from nano-sized carbon nanotubes and are thus difficult to be dispersed. In addition, since the carbon nanotubes tend to aggregate due to strong van der Waals forces, a dispersion inducer may be further added so that the carbon nanotubes and the aluminum alloy powder can be evenly dispersed.

As the dispersion inducer, nanoparticles made of any one ceramic selected from the group consisting of $SiC$, $SiO_2$, $Al_2O_3$, $TiO_2$, $Fe_3O_4$, $MgO$, $ZrO_2$, and mixtures thereof may be used.

The ceramic nanoparticles function to evenly disperse the carbon nanotubes in the aluminum alloy particles. Particularly, the nano SiC (nano silicon carbide) has high tensile strength and sharpness as well as constant electrical and thermal conductivity, high hardness, high fire resistance, high thermal shock resistance, and excellent high-temperature characteristics and chemical stability. As a result, the nano SiC can be used as an abrasive material and a refractory material. Furthermore, the nano SiC particles present on the surface of the aluminum alloy particles prevent direct contact between the carbon nanotubes and the aluminum alloy particles so that formation of undesirable aluminum carbide that can be formed through a reaction between the commonly known carbon nanotubes and the aluminum alloys can be inhibited.

In addition, the composite powder may include 100 parts by volume of the aluminum alloy powder and 0.01 parts to 10 parts by volume of the carbon nanotubes.

When the content of the carbon nanotubes is less than 0.01 parts by volume with respect to 100 parts by volume of the aluminum alloy powder, the carbon nanotubes may poorly perform a role as a reinforcing material because the composite material exhibits strength not superior to pure aluminum or the aluminum alloy. On the contrary, when the content of the carbon nanotubes exceeds 10 parts by volume with respect to 100 parts by volume of the aluminum alloy powder, the strength of the composite material may be increased, compared to that of pure aluminum or the aluminum alloy, but the elongation rate thereof may be decreased. In addition, when the content of the carbon nanotubes is excessively high, dispersion may be rather deteriorated and the carbon nanotubes may act as a defect, resulting in a deterioration in mechanical and physical properties.

Furthermore, the composite powder may further include 1 part to 50 parts by volume of a metal other than aluminum and/or 1 part to 50 parts by volume of a metal silicide or a metal boride, with respect to 100 parts by volume of the aluminum alloy powder.

In this case, the metal other than aluminum is preferably one metal or an alloy of two or more metals selected from the group consisting of Cu, Ti, Mg, K, Ca, Sc, V, Cr, Mn, Fe, Co, Ni, Zn, Ga, Rb, Sr, Y, Zr, Mo, Ru, Rh, Pd, Ag, Cd, In, Sn, Cs, Ba, La, Ce, Nd, Sm, Eu, Gd, Tb, W, Cd, Sn, Hf, Ir, Pt, and Pb. In addition, the metal silicide is preferably at least one selected from among $CrSi_2$, $Cr_2Si$, $HfSi$, $MoSi_2$, $NbSi_2$, $TaSi_2$, $Ta_5Si_3$, $ThSi_2$, $Ti_5Si_3$, $WSi_2$, $W_5Si_3$, $V_3Si$, and $ZrSi_2$. Furthermore, the metal boride is preferably at least one selected from among $AlB_2$, $BeB_2$, $CrB_2$, $HfB_2$, $LaB_2$, $MoB_2$, $MoB$, $NbB_2$, $SiB_2$, $TaB_2$, $ThB_4$, $TiB_2$, $WB$, $VB_2$, and $ZrB_2$.

In addition, in the case where the composite powder further includes the dispersion inducer, the composite powder may further include 0.1 parts to 10 parts by volume of the dispersion inducer with respect to 100 parts by volume of the aluminum alloy powder.

When the content of the dispersion inducer is less than 0.1 parts by volume with respect to 100 parts by volume of the aluminum alloy powder, the effect of inducing dispersion may be insignificant. When the content of the dispersion inducer exceeds 10 parts by volume with respect to 100 parts by volume of the aluminum alloy powder, dispersion may be deteriorated due to the aggregation of the carbon nanotubes, and the dispersion inducer may thus act as a defect.

On the other hand, the ball milling may be specifically performed in the air or an inert atmosphere, for example, a nitrogen or argon atmosphere, at a low speed in a range of 150 r/min to 300 r/min or a high speed of 300 r/min or more for 12 hours to 48 hours, using a ball mill, for example, a horizontal or planetary ball mill.

In this case, the ball milling may be performed by charging 100 parts to 1500 parts by volume of stainless balls (a mixture of balls with a diameter of 20 mm and balls with a diameter of 10 mm in a ratio of 1:1) in a stainless container with respect to 100 parts by volume of the composite powder.

In addition, to reduce friction coefficient, 10 parts to 50 parts by volume of at least one organic solvent selected from the group consisting of heptane, hexane, and alcohol may be used as a process control agent with respect to 100 parts by volume of the composite powder. The organic solvent is completely evaporated in a hood when opening the container, after the ball milling, and then collecting the mixed powder, which leaves only the aluminum alloy powder and the carbon nanotubes in the collected mixture powder.

In this case, the dispersion inducer, which is the nano-sized ceramic, may act like the nano-sized milling balls due to the rotational force generated in the ball milling process. As a result, the physically aggregated carbon nanotubes can be separated, and fluidity can be increased, thereby further evenly dispersing the carbon nanotubes on the surface of the aluminum particles.

Next, in the (b) manufacturing, the multilayer billet containing the prepared composite powder is manufactured.

The multilayer billet manufactured herein includes the core layer and the two or more shell layers surrounding the core layer. The core layer is made of the composite powder or the aluminum alloy, each of the shell layers excluding the outermost shell layer is made of the composite powder, and the outermost shell layer is made of the aluminum alloy.

When the number of shell layers excluding the outermost shell layer is two or more, the respective composite powders contained in the two or more shell layers preferably differ in composition, that is, a content ratio of the aluminum alloy powder and the carbon nanotube powder.

In addition, even when the core layer is made of the composite powder, the respective composite powders contained in the core layer and each of the one or more shell layers excluding the outermost shell layer preferably differ in composition so that the respective volume fractions of the carbon nanotubes to the aluminum alloy powder are different from each other.

On the other hand, the number of shell layers constituting the multilayer billet is not particularly limited. Preferably, the shell layers are formed of 5 layers or less in consideration of cost-effectiveness.

Figure 2:
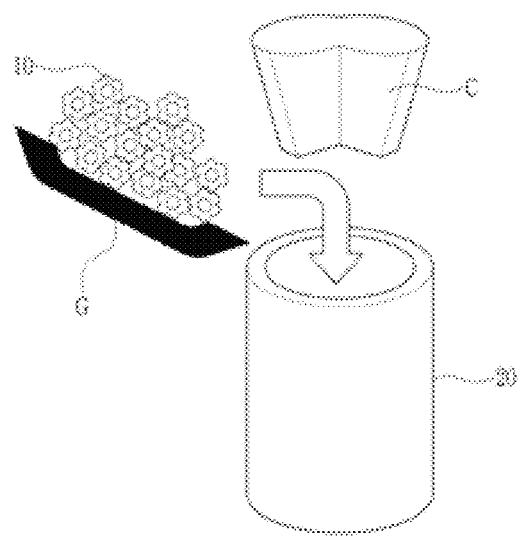
FIG. 2 is a schematic view illustrating a process of manufacturing a multilayer billet used for manufacturing a heterogeneous composite material thin plate according to the present disclosure.

FIG. 2 is a view schematically illustrating one example of a manufacturing process of the multilayer billet as described above.

Referring to FIG. 2, the billet may be manufactured by charging the composite powder 10 in a metal can 20 using a guider G and then sealing or compressing the metal can 20 with a cap C so that the powder is prevented from flowing out.

As the metal can 20, any material can be used as long as the material is made of a metal having electrical and thermal conductivity. An aluminum or aluminum alloy can, a copper can, or a magnesium can is preferably used. Assuming that the billet has a size of 6 inches, the metal can 20 may have a thickness in a range of 0.5 mm to 150 mm. However, a thickness ratio of the metal can 20 may vary depending on sizes of the billet.

Figure 3:
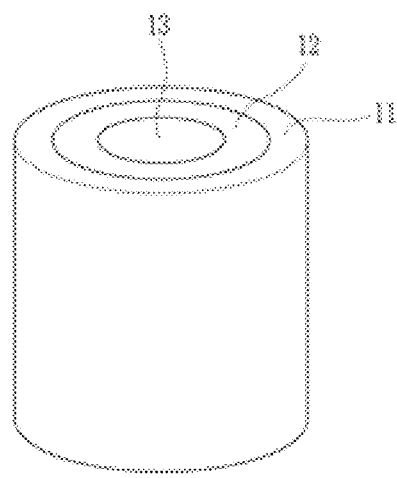
FIG. 3 is a schematic view illustrating one example of a multilayer billet used for manufacturing a heterogeneous composite material thin plate according to the present disclosure.
Figure 4:
FIG. 4 is a view showing an aluminum-carbon nanotube heterogeneous composite material thin plate manufactured by performing rolling on a multilayer billet containing aluminum-carbon nanotube composite powder in one embodiment of the present disclosure.

FIG. 3 is a perspective view schematically illustrating the multilayer billet including the core layer and the two shell layers surrounding the core layer, that is, the multilayer billet including the core layer, a first shell layer surrounding the core layer, and a second shell layer surrounding the first shell layer, as one example of the multilayer billet that can be manufactured herein.

Referring to FIG. 3, in a hollow cylinder-shaped first billet 11 serving as the second shell layer, a second billet 12, having a different component from the first billet 11 and serving as the first shell layer, may be placed. Then, a third billet 13, having a different component from the second billet 12 and serving as the core layer, may be further placed in the second billet 12 to manufacture the multilayer billet.

In this case, the first billet 11 has the hollow cylinder shape, which may include a can shape with one end being closed or the hollow cylinder shape with both ends being opened. The first billet 11 may be made of aluminum, copper, magnesium, and the like. A base metal material may be melted, and then put into a mold to manufacture the hollow cylinder-shaped first billet 11. Alternatively, the first billet 11 may be manufactured by machining.

The second billet 12 may contain the prepared composite powder. In addition, the second billet 12 may be provided in a bulk or powder form.

When the second billet 12 is provided in the bulk form, the second billet 12 may specifically have a cylinder shape, and the multilayer billet may be manufactured by placing the cylinder-shaped second billet 12 in the first billet 11. In this case, as a method of placing the second billet 12 in the first billet 11, after melting the composite powder of the second billet 12 and putting the molten powder into a mold to form the cylinder shape, the molten powder may be fit into the first billet 11. Alternatively, the composite powder of the second billet 12 may be directly charged in the first billet 11.

The third billet 13 may be provided in a metal bulk or powder form.

On the other hand, when the second billet 12 or the third billet 13 is provided in the bulk form containing the composite powder, the composite powder may be manufactured in the bulk form by sintering or compression at high pressure.

In this case, the respective composite powders contained in the second billet 12 and the third billet 13 differ in composition. For example, when heterogeneous materials contained in the composite powder are the aluminum (or aluminum alloy) powder and the carbon nanotubes (CNTs), the second billet 12 may contain 0.09 parts to 10 parts by volume of the carbon nanotubes with respect to 100 parts by volume of the aluminum alloy. In addition, the third billet 13 may contain more than 0 parts by volume and 0.08 parts by volume or less of the carbon nanotubes with respect to 100 parts by volume of the aluminum alloy powder.

Alternatively, the second billet 12 may contain the composite powder, and the third billet 13 may be provided in the form of a metal bulk or metal powder selected from the group consisting of aluminum, copper, magnesium, titanium, stainless steel, tungsten, cobalt, and an alloy thereof.

The multilayer billet may contain 0.01% to 10% by volume of the second billet 12 and 0.01% to 10% by volume of the third billet 13, with respect to the total volume of the multilayer billet, and may contain the remainder of the first billet 11.

On the other hand, as the multilayer billet includes the second billet 12 or the third billet 13, which contains the composite powder, a process of compressing the multilayer billet at a high pressure in a range of 10 MPa to 100 MPa may be included before sealing the multilayer billet.

As the multilayer billet is compressed, the multilayer billet is then allowed to be extruded using extrusion dies. When the composite powder is compressed under a pressure condition of less than 10 MPa, pores may be formed in the obtained plastically-worked composite material, and the composite powder is likely to flow down. When the composite powder is compressed under a pressure condition exceeding 100 MPa, the second billet (second and higher-order billets) may expand due to the high pressure.

In addition, as the multilayer billet includes the second billet and/or the third billet, which contains the composite powder, a process of sintering the multilayer billet may be further included so that the multilayer billet is allowed to be provided in the following plastic working process, such as extrusion and the like.

Although spark plasma sintering apparatus or hot press sintering apparatus can be used in the sintering process, any sintering apparatus can be used as long as the same objective can be achieved. However, when the sintering process is required to be performed precisely in a short time, the spark plasma sintering apparatus is preferably used. In this case, a spark plasma sintering process may be performed under conditions: a temperature in a range of 280° C. to 600° C., a pressure in a range of 30 MPa to 100 MPa, and a duration in a range of 1 second to 30 minutes.

Subsequently, in the (c) shaping, the multilayer billet is subjected to a rolling process so that the multilayer billet can be shaped into the thin plate.

For example, hot rolling and cold rolling may be sequentially performed to shape the multilayer billet into the thin plate. Alternatively, only the cold rolling may be performed to shape the multilayer billet into the thin plate.

When the hot rolling is performed before the cold rolling, the hot rolling is preferably performed at a starting temperature of 500° C. or higher so that intermetallic compounds derived from alloying elements in the aluminum alloy do not precipitate and adversely affect the mechanical properties of the composite material. In addition, the hot rolling is preferably performed at an end temperature of 300° C. or lower so that a deterioration in mechanical properties of the composite material caused by recrystallization during a cooling process is prevented, after the hot rolling. The end temperature is more preferably in the range of 270° C. to 300° C.

On the other hand, a thickness of the heterogeneous composite material thin plate, obtained through the rolling process herein, is preferably in a range of 5 μm to 2,000 μm.

When the thickness of the thin plate is smaller than 5 μm, the mechanical properties of the thin plate may be deteriorated, and there is a concern in that wrinkles may be possibly formed on the surface of the thin film in the rolling process. When the thickness of the thin plate is larger than 2,000 μm, there may be a restriction in processing due to the excessive thickness when additional shaping is required after manufacturing the thin plate, which is undesirable.

Furthermore, the present disclosure may further include manufacturing a heterogeneous composite material thin plate clad material by stacking the two or more thin plates manufactured in the (c) shaping and then performing the cold rolling.

In this case, the heterogeneous composite material thin plate clad material is preferably a functionally graded material (FGM) whose compositions change in a thickness direction of the clad material because a volume ratio of a dispersed phase, with respect to 100 volume ratio of the aluminum alloy in a matrix phase, varies in each of the aluminum alloy/CNT-containing layers included in the two or more thin plates.

For example, when manufacturing a functionally graded clad material by stacking two thin plates (first and second thin plates), manufactured by independently rolling each multilayer billet including three layers (a core layer, a first shell layer, and a second shell layer), the first thin plate may be manufactured by rolling a multilayer billet including a first shell layer made of a composite powder with a first composition and a core layer made of a composite powder with a second composition. The second thin plate may be manufactured by rolling a multilayer billet including a first shell layer made of a composite powder with a third composition and a core layer made of a composite powder with a fourth composition. Next, the first and second thin plates may be stacked and then subjected to cold rolling to manufacture a functionally graded clad material. In this case, the first, second, third, and fourth compositions are different from each other.

According to the method of manufacturing the heterogeneous composite material thin plate of the present disclosure as described above, aluminum (or aluminum alloy) and carbon nanotubes can be combined to maximize the advantages of each material as well as to compensate for the disadvantages thereof. In addition, aluminum (or aluminum alloy)-carbon nanotube heterogeneous composite material thin plate can be manufactured in high yield through a simple and rapid process, in which the thin plate can be applied to a variety of fields (including packaging materials for medicines and the like, container materials, heat exchanger fins, wire covering materials, etc.) depending on a thickness thereof due to its thin plate form.

MODS FOR INVENTION

Hereinafter, the present disclosure will be described in more detail with reference to an embodiment.

The embodiment according to the present specification may be modified in many different forms, and the scope of the present specification is not construed as being limited to the embodiment described below. The embodiment of the present disclosure described hereinbelow is provided for allowing those skilled in the art to more clearly comprehend the present disclosure.

Example

Carbon nanotubes having a purity of 99.5%, a diameter of nm or less, and a length of 30 μm or less (Luxembourg, manufactured by OCSiAl Co., Ltd.) and aluminum powder having an average particle size of 45 μm and a purity of 99.8% (South Korea, manufactured by MetalPlayer) were used.

On the other hand, a cylinder-shaped third billet was placed in the center of an aluminum alloy can serving as a first billet, and a second billet (composite powder) was placed between the first and third billets to manufacture a multilayer billet.

The second billet contains aluminum-CNT composite powder containing 0.1 parts by volume of the carbon nanotubes with respect to 100 parts by volume of the aluminum powder. The first billet was made of 6063 aluminum, and the third billet was made of 3003 aluminum alloy.

Specifically, the second billet was manufactured by the following method. 30% by volume of a stainless container was filled with 100 parts by volume of the aluminum powder and 0.1 parts by volume of the carbon nanotubes. Then, another 30% by volume of the stainless container was filled with stainless balls (a mixture of balls with a diameter of 20 mm and balls with a diameter of 10 mm), and 50 ml of heptane was added thereto. Next, using a horizontal ball mill, the aluminum powder and the carbon nanotubes were subjected to low-speed ball milling at 250 rpm for 24 hours. Thereafter, the container was opened so that the added heptane was completely evaporated from a hood, and the aluminum-CNT composite powder was then collected.

The prepared aluminum-CNT composite powder was charged in a gap of 2.5 t between the first and third billets and then compressed at a pressure of 100 MPa to manufacture the multilayer billet.

The multilayer billet was manufactured into a thin plate with a final required thickness of 1.0 mm at a rolling speed of 5 mm/s in a rolling reduction amount of 0.2 mm.

Although the embodiment of the present disclosure has been described with reference to the accompanying drawings, those skilled in the art will appreciate that various modifications, additions and substitutions are possible, without departing from the scope and spirit of the disclosure as disclosed in the accompanying claims. It is thus well known to those skilled in that art that the present disclosure is not limited to the embodiment disclosed in the detailed description.

INDUSTRIAL APPLICABILITY

According to the present disclosure, aluminum (or aluminum alloy)-carbon nanotube heterogeneous composite material thin plate, which can be applied to a variety of fields (including battery cases, 5G repeaters, ESS cases, packaging materials for medicines, etc., container materials, heat exchanger fins, wire covering materials, etc.), can be manufactured in high yield through a simple and rapid process.

The invention claimed is:

1. A method of manufacturing a heterogeneous composite material thin plate, the method comprising:
   (a) preparing a composite powder by ball-milling an aluminum or aluminum alloy powder and a carbon nanotube powder;
   (b) manufacturing a multilayer billet containing the composite powder and comprising a core layer and two or more shell layers surrounding the core layer, wherein the core layer is made of the composite powder or an aluminum alloy,
   each of the shell layers excluding the outermost shell layer is made of the composite powder, and
   the outermost shell layer is made of (i) an aluminum or aluminum alloy powder or (ii) the composite powder; and
   (c) shaping the multilayer billet into a thin plate by rolling.

2. The method of claim 1, wherein the core layer is made of the composite powder, and
   the respective composite powders comprised in the core layer and each of the shell layers excluding the outermost shell layer differ in composition.

3. The method of claim 1, wherein the multilayer billet comprises:
   the core layer;
   a first shell layer surrounding the core layer; and
   a second shell layer surrounding the first shell layer.

4. The method of claim 3, wherein the multilayer billet comprises:
   a can-shaped first billet serving as the second shell layer;
   a second billet placed in the first billet and serving as the first shell layer; and
   a third billet placed in the second billet and serving as the core layer.

5. The method of claim 1, wherein in the (b) manufacturing, the multilayer billet is subjected to spark plasma sintering under conditions: a temperature in a range of 280° C. to 600° C., a pressure in a range of 30 MPa to 100 MPa, and a duration in a range of 1 second to 30 minutes.

6. A heterogeneous composite material thin plate manufactured by the method of claim 1.

* * * * *